United States Patent [19]

Niwa

[11] Patent Number: 5,280,161

[45] Date of Patent: Jan. 18, 1994

[54] APPARATUS FOR OPTICALLY READING A BAR CODE

[75] Inventor: Katsuhisa Niwa, Osaka, Japan

[73] Assignee: West Electric Company, Ltd., Osaka, Japan

[21] Appl. No.: 807,418

[22] Filed: Dec. 13, 1991

Related U.S. Application Data

[63] Continuation of Ser. No. 437,013, Nov. 15, 1989, abandoned.

[30] Foreign Application Priority Data

Nov. 18, 1988 [JP] Japan ................................. 63-292787

[51] Int. Cl.[5] .............................................. G06K 7/10
[52] U.S. Cl. .................................... 235/462; 235/472
[58] Field of Search ............... 235/439, 454, 460, 462, 235/467, 472, 455

[56] References Cited

U.S. PATENT DOCUMENTS

| | | | |
|---|---|---|---|
| 3,322,935 | 5/1967 | Wyke et al. | 455/600 |
| 3,529,133 | 9/1970 | Kent et al. | 235/462 X |
| 4,034,230 | 7/1977 | Brill et al. | 250/566 |
| 4,074,258 | 2/1978 | Dore et al. | 235/454 |
| 4,210,802 | 7/1980 | Sakai | 235/483 |
| 4,411,016 | 10/1983 | Wakeland | 235/462 |
| 4,473,746 | 9/1984 | Edmonds | 235/462 |
| 4,542,548 | 9/1985 | Sanner et al. | 235/462 |
| 4,575,625 | 3/1986 | Knowles | 235/467 |
| 4,734,566 | 3/1988 | Senda et al. | 235/455 |
| 4,743,773 | 5/1988 | Katana et al. | 250/566 |
| 4,753,498 | 6/1988 | Saitoh et al. | 350/6.8 |
| 4,809,351 | 2/1989 | Abramovitz et al. | 235/474 |
| 4,818,847 | 4/1989 | Hara et al. | 235/455 |
| 4,978,860 | 12/1990 | Bayley et al. | 250/568 |
| 5,010,241 | 4/1991 | Butterworth | 235/462 |
| 5,019,699 | 5/1991 | Koenck | 235/472 |

FOREIGN PATENT DOCUMENTS

| | | | |
|---|---|---|---|
| 0101939 | 3/1984 | European Pat. Off. | |
| 0197673 | 10/1986 | European Pat. Off. | |
| 0256296 | 2/1988 | European Pat. Off. | |
| 0276589 | 8/1988 | European Pat. Off. | |
| 60-55478 | 3/1985 | Japan | 235/462 |
| 62-17270 | 4/1987 | Japan | |
| 62-147579 | 7/1987 | Japan | 235/462 |
| 63-58588 | 3/1988 | Japan | 235/462 |
| 63-191288 | 8/1988 | Japan | 235/462 |
| 777557 | 6/1957 | United Kingdom | 235/454 |
| 1246555 | 9/1971 | United Kingdom | |
| 1365646 | 9/1974 | United Kingdom | |
| 1388134 | 3/1975 | United Kingdom | |

*Primary Examiner*—Davis L. Willis
*Assistant Examiner*—Edward H. Sikorski
*Attorney, Agent, or Firm*—Cushman, Darby & Cushman

[57] ABSTRACT

Light emitted from either one or two light sources is converged by first and second lenses to illuminate a strip shaped area where an object with a bar code is disposed. Alternatively, the first and second lenses may be combined with one another to form a single, multifunctional lens.

9 Claims, 11 Drawing Sheets

FIG.6
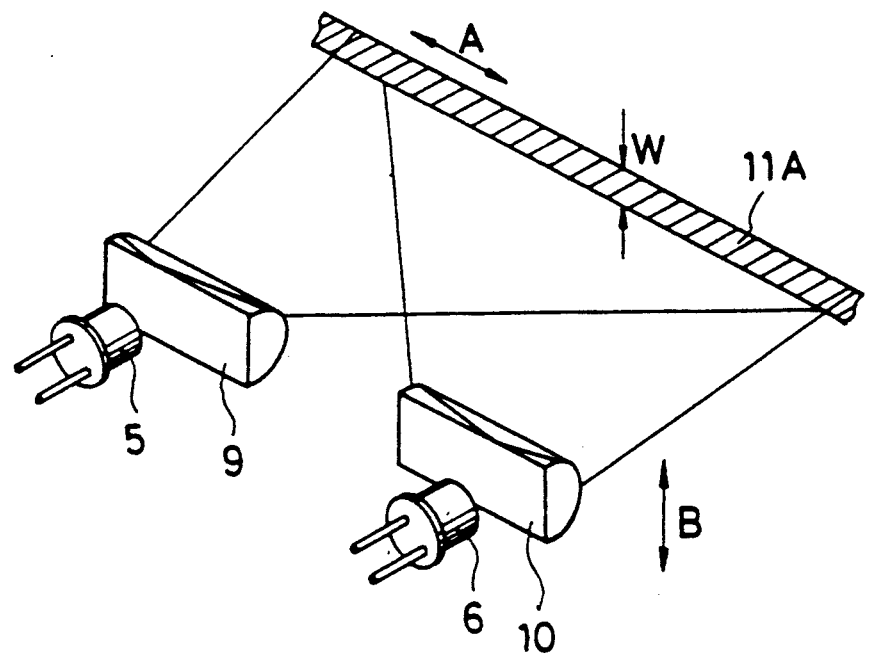
FIG.7 (Comparison Example)
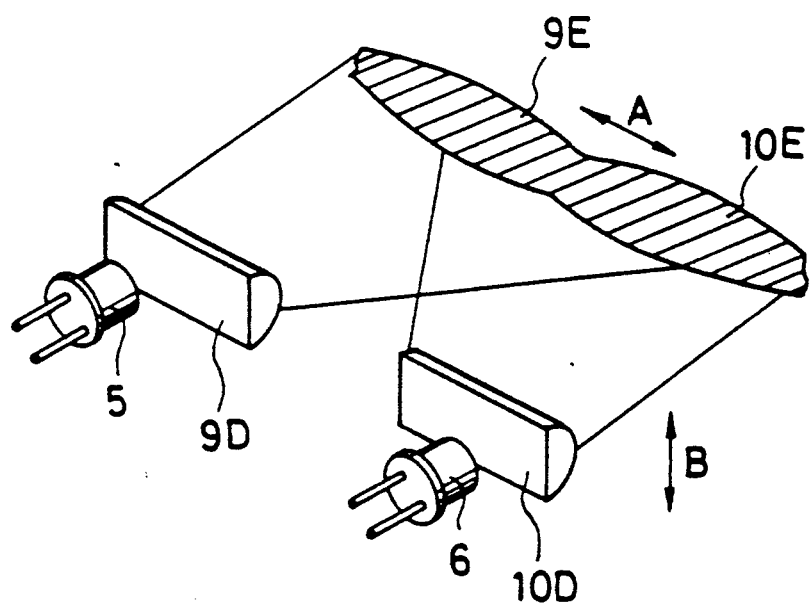

Relative position

APPARATUS FOR OPTICALLY READING A BAR CODE

This is a continuation of application Ser. No. 07/437,013, filed on Nov. 15, 1989, which was abandoned upon the filing hereof.

FIELD OF THE INVENTION AND RELATED ART STATEMENT

1. Field of the Invention

The present invention relates generally to an optical code reader, and more particularly to an optical system for converging light radiated from a light source such as a light emitting diode on a surface of an object provided with an optical code.

2. Description of the Related Art

In an optical code reader such as a bar-code reader using a charge coupled device or an image scanner commonly in use today as a detecting device, an object provided with a bar-code is illuminated with an illuminating means using a light emitting diode (hereinafter referred to as a LED) to emit high luminance red light.

An example of the illuminating means disclosed in Japanese Patent No. 62-17270 is shown in FIG. 13(a). Referring to FIG. 13(a), four LEDs $L_1$, $L_2$, $L_3$ and $L_4$ are aligned in a single line, and each light radiated from the LEDs is directed to the surface of the object 1 printed with the bar-code 3 through a light diffusing member 2. Reflected light from the bar-code 3 is focused on an optical line sensor 6 using the charge coupled device via a plane mirror 4 and a lens 5.

Another Prior Art of the illuminating means is shown in FIG. 13(b). Referring to FIG. 13(b), a rod lens 7 is placed on a plurality of the LED chips $CL_1$, $CL_2$ ... $CL_n$ aligned on a substrate 8 and the light beams from the LEDs are focused thereby.

In the illuminating means for the optical code reader, in general, it is necessary to emit sufficiently strong light to eliminate influence due to circumferential light and to realize uniform illuminance distribution on the object. Furthermore, it is experimentally found that the illuminance distribution is preferably higher on both end parts than on a central part of a long and slender illumination area on the object.

In the former prior art shown in FIG. 13(a), illuminance required for detection of the bar-code 3 is attained by using a plurality of LEDs, and uniformity in illuminance is attained by using the light diffusing member 2. Moreover, the voltage which is applied to the LEDs $L_1$ and $L_4$ which are placed on the end parts may be raised enhanced, hence to enhance the illuminance on the both end parts of the object. However, use of the light diffusing member 2 leads to less illuminance on the object, and efficiency of light is reduced. Additionally, assembly work of the many LEDs is troublesome and is expensive in assembly cost.

The latter illuminating means shown in FIG. 13(b) is attainable a necessary illuminance and uniform illuminance distribution by mean of alignment of a large number of the LED chips $CL_1$ ... $CL_n$. Moreover, enhancement of illuminance on the end parts of the object to be illuminated may be attained by increasing voltage applied to the LED chips $CL_1$, $CL_2$, $CL_{n-1}$, $CL_n$ placed thereon, or by decreasing interval between the neighboring two LEDs at the end parts of the illuminating means. In the latter prior art, comparatively uniform illuminance distribution is attainable by adjustment in the light intensity of the respective LEDs provided with voltage adjusting circuits. Hence, a manufacturing cost is expensive due to not only the large number of the LEDs but also the respective adjusting circuits.

OBJECT AND SUMMARY OF THE INVENTION

An object of the present invention is to provide an optical code reader comprising an optical system for converging light emitted from a light source into a strip-shaped illuminating area.

The optical code reader in accordance with the present invention comprises:

a light source for emitting a light beam, optical means for converging the light beam in a first direction which is substantially parallel to the lengthwise direction of a strip-shaped region having a predetermined width whereto an object provided with an optical code is to be disposed for reading and in a second direction which is substantially perpendicular to the first direction and an optical axis passing the center of the light source, the optical means being disposed between the light source and the object, and optical read means for reading the optical code with a line-sensor mounted thereon.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 6 is a perspective view of the optical system of the first embodiment;

FIG. 7 is a perspective view of an optical system using other type of a second lens;

DESCRIPTION OF THE PREFERRED EMBODIMENTS

Figure 1:
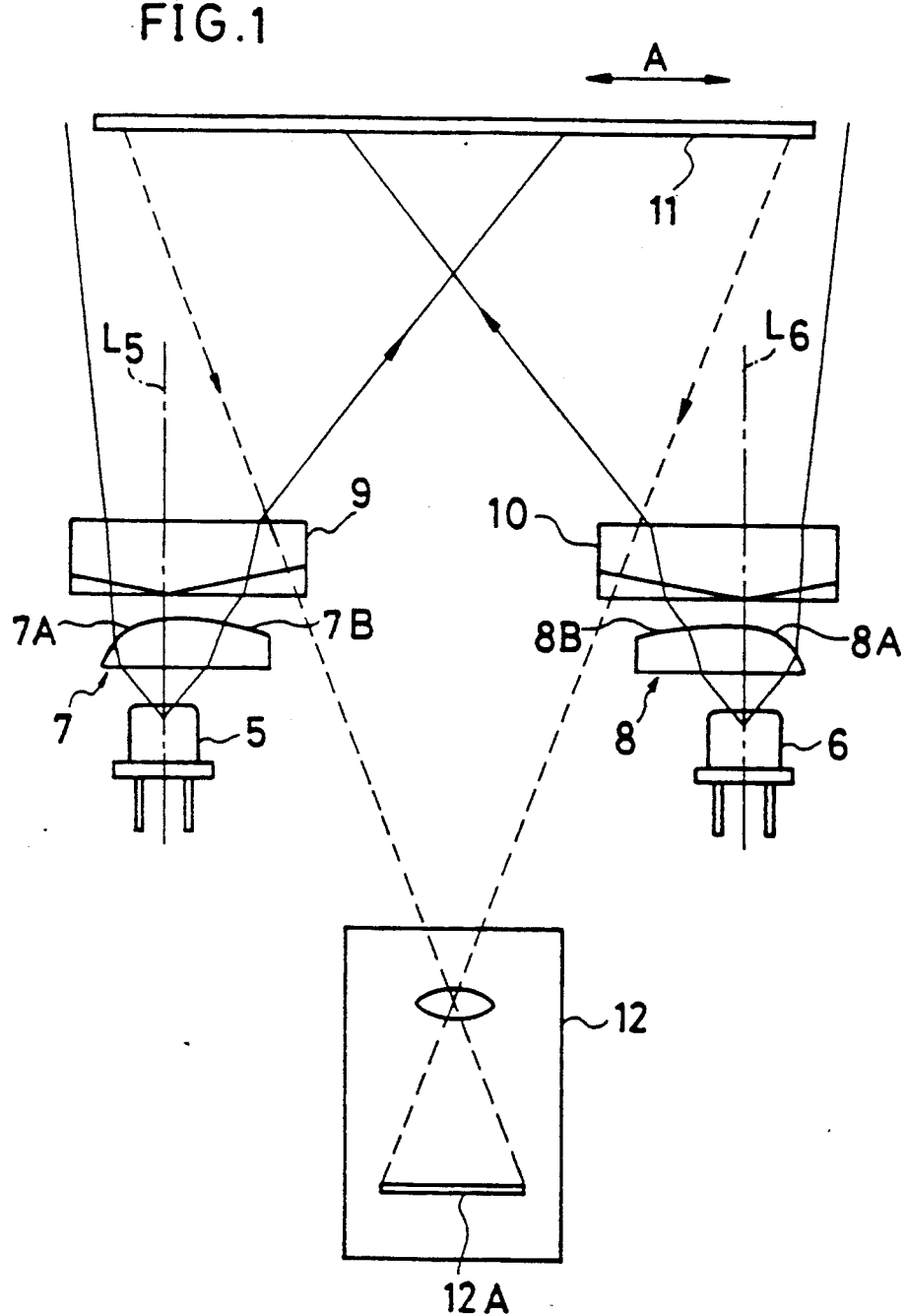
FIG. 1 is a plan view of a first embodiment of an optical system in the optical code reader in accordance with the present invention.
Figure 2:
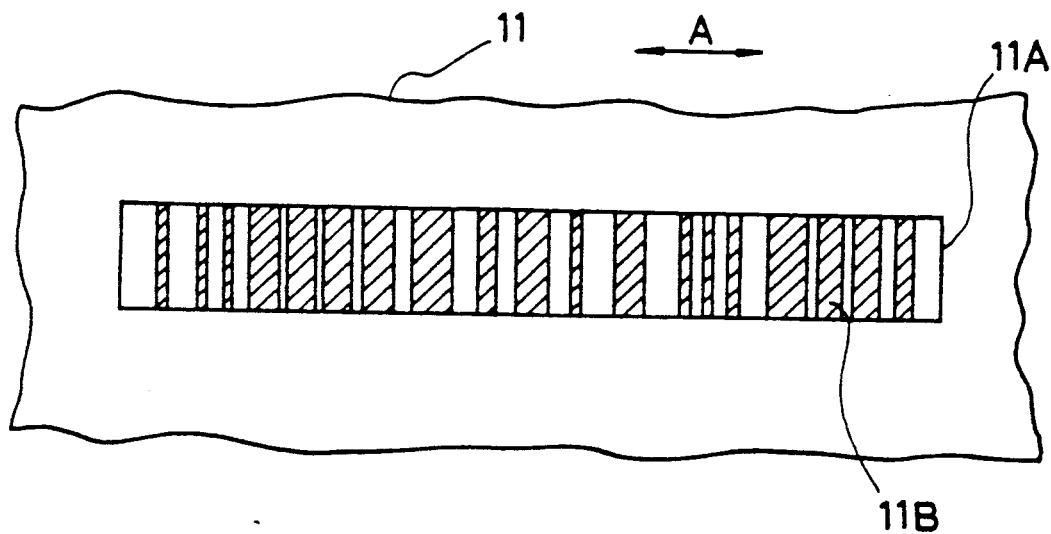
FIG. 2 is a front view of a strip-shaped illuminating area on an object provided with a bar-code.

FIG. 1 is a plan view of a first embodiment of the optical code reader in accordance with the present invention. Two LEDs 5 and 6 are positioned with an interval therebetween and face an object 11 provided with a bar-code, for example. First lenses 7 and 8 are located in front of the LEDs 5 and 6, respectively, and furthermore, second lenses 9 and 10 are located in front of the first lenses 7 and 8, respectively. The object 11 to be read is placed at a predetermined position which is apart from the second lenses 9 and 10 and is illuminated by the light emitted from the LEDs 5 and 6. As shown in FIG. 2, the object 11 has a strip-shaped code area 11A on which the bar-code 11B is disposed perpendicular to a first direction indicated by arrow A, for example. The bar-code 11B is read by an optical read means 12 having a line sensor 12A (FIG. 1) which comprises a row of a large number of optical sensors. The strip-shaped code area 11A is required to be uniformly illuminated.

Figure 3:
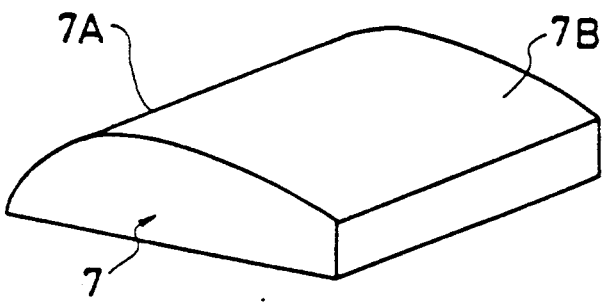
FIG. 3 is a perspective view of a first lens in the optical system.

FIG. 3 is a perspective view of the first lens 7. The other first lens 8 is configurated similarly but is a mirror image of the first lens 7. The lens 7 has a relatively small curvature radius at an outside part 7A, and a relatively large curvature radius at an inside part 7B. As shown in FIG. 1, the parts 7B and 8B are located inside the region which is between both optical axes L5 and L6 of the LEDs 5 and 6. Conversely, the parts 7A and 8A are located outside thereof. The line sensor 12A is disposed in parallel to a line connecting both the LEDs 5 and 6.

Figure 4:
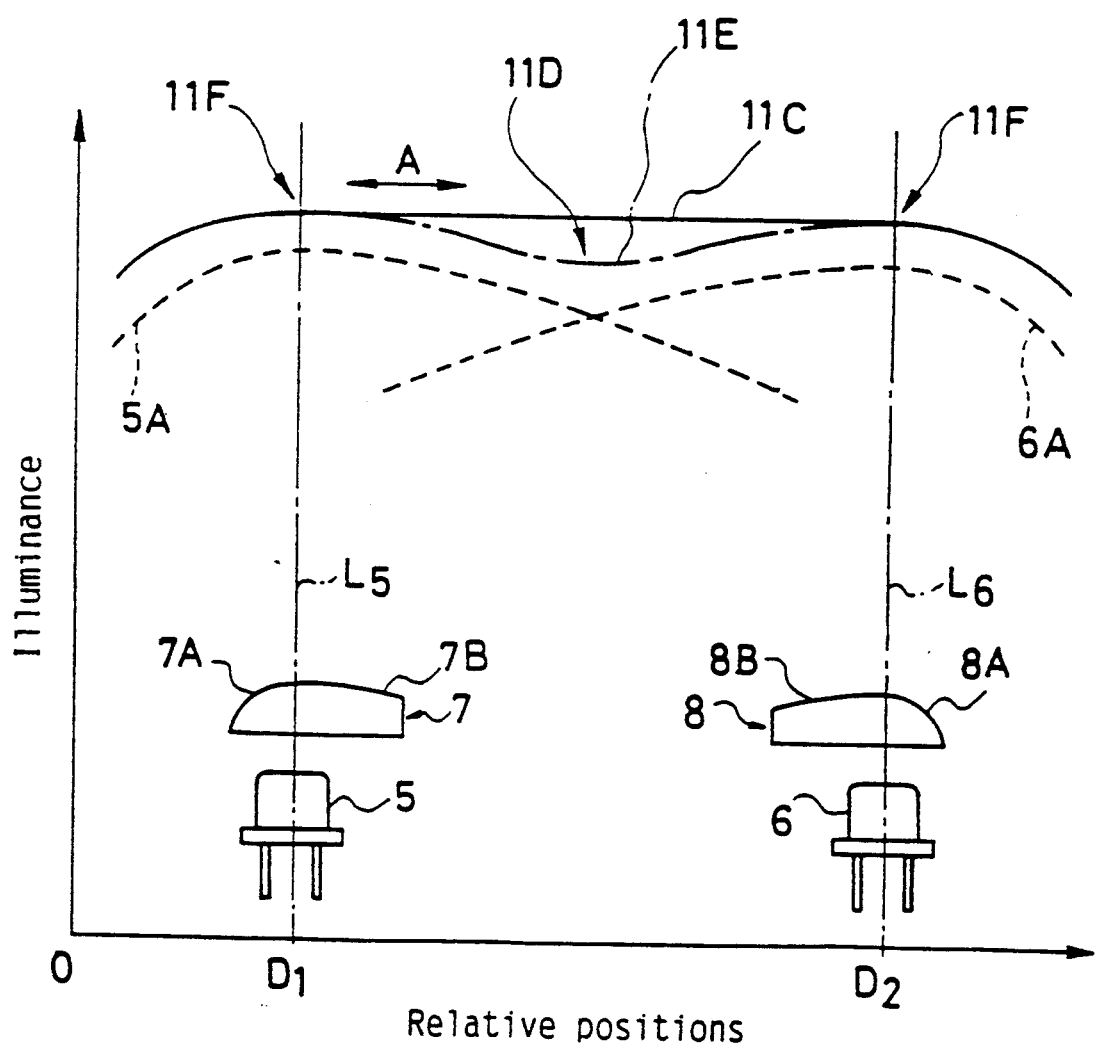
FIG. 4 is a graph of illuminance distribution by mean of the optical system of the first embodiment.

FIG. 4 is a graph of illuminance distribution on the object 11 on which the light beams emitted from the two LEDs 5 and 6 are converged with the respective first lenses 7 and 8. Abscissa designates relative positions, and ordinate designates an illuminance on the object 11. The LEDs 5 and 6 are located at positions D1 and D2, respectively. Referring to the graph, broken lines 5A and 6A represents the in direction A by LEDs 5 and 6. Hence, in direction A on the object 11 results in substantial uniformity of illuminance as shown by a solid line 11C in the region between the positions D1 and D2.

In the first embodiment, illuminance on the central part 11D can be lowered by changing the curvature radius of the parts 7B and 8B of the first lenses 7 and 8, as shown by an alternate long and short dash line 11E. According to this illuminance distribution in direction A, the illuminance is relatively enhanced at both end parts 11F, as a result of slight illuminance drop at the central part 11D.

Figure 5A:
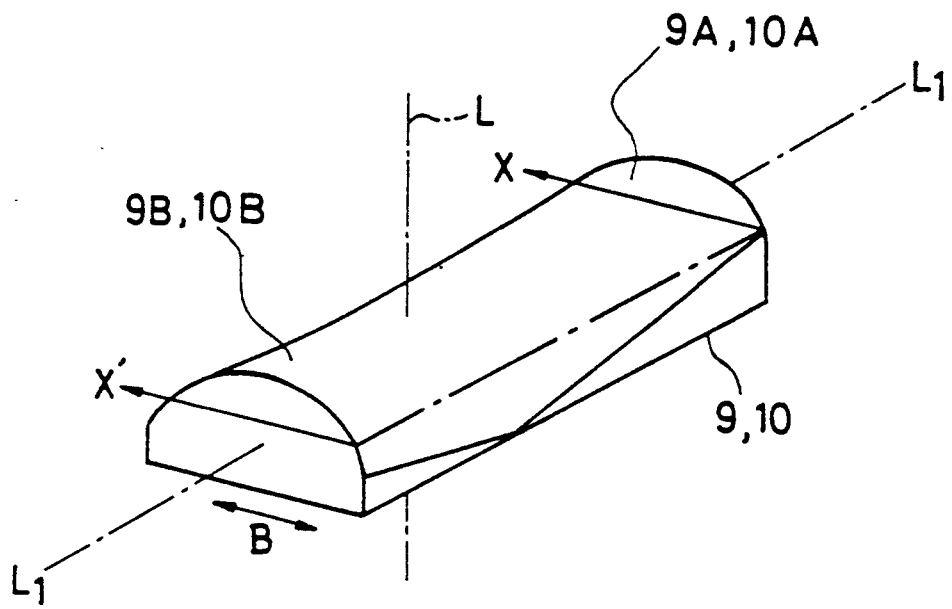
FIG. 5(a) is a perspective view of a second lens in the optical system.
Figure 5B:
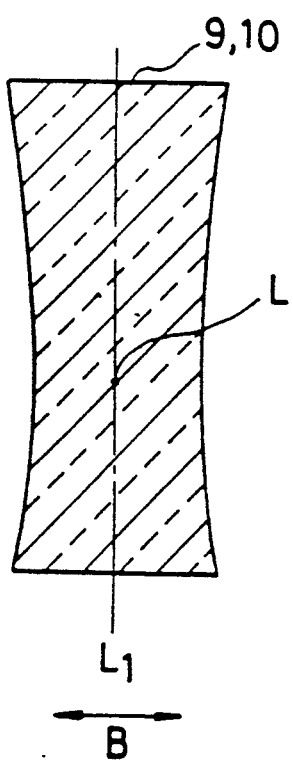
FIGS. 5(b) and 5(c) are cross sectional views of the second lens.
Figure 5C:
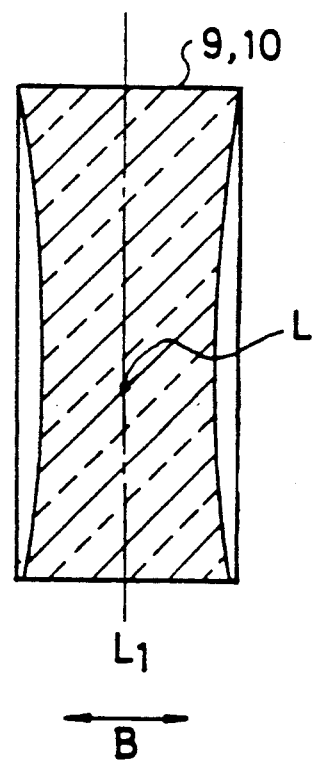

FIG. 5(a) is a perspective view of the second lens 9 or 10, and FIGS. 5(b) and 5(c) are horizontal sections of FIG. 5(a) taken along the line X—X'. An alternate long and short dash line L designates the optical axis of the light beam emitted from the LED 5 or 6. The second lens 9 or 10 is of semicylindrical shape with a semicircular cross-section in direction B, and the curvature radius of the upper part is varied along the length. The curvature radius is smallest on the part adjacent to the optical axis L, and gradually increases toward both ends. The optical axis L is not on the center of the second lens 9 or 10, but is dislocated a predetermined distance from the center on a horizontal axis L1 along the length thereof. A variation ratio of the curvature radius on the longer part 9A or 10A with respect to the optical axis L is selected to be larger than that of the shorter part 9B or 10B. In assembly of the optical code reader, the longer sides 9A and 10A are disposed inside and hence the shorter sides 9B and 10B are disposed outside. The second lenses 9 and 10 are located in a manner that the common axis L1 (FIG. 5(b) and FIG. 5(c)) which is along the length of the second lenses 9 and 10 is included in a plane in which the axes L5 and L6 are included, and the common axis is disposed parallel to the line sensor 12A. The optical axes L of the second lens 9 and 10 are in coincidence with the optical axes L5 and L6 of the first lenses 7 and 8, respectively as shown in FIG. 1. Thus, the light beam radiated from the LED 5 and 6 are converged in direction B which is perpendicular to direction A by the second lens 9 or 10, and consequently the light beam is converged on a strip-shaped area 11A having a predetermined width W as shown in FIG. 6.

FIG. 7 is a perspective view of an optical system using semicylindrical-shaped lenses 9D and 10D, for example. In this case, the light beams radiated from the LEDs 5 and 6 are converged in direction B on barrel-shaped areas 9E and 10E instead of the strip-shaped area shown in FIG. 6. In the general optical code reader, the strip-shaped area is preferable to the barrel-shaped area.

Figure 8:
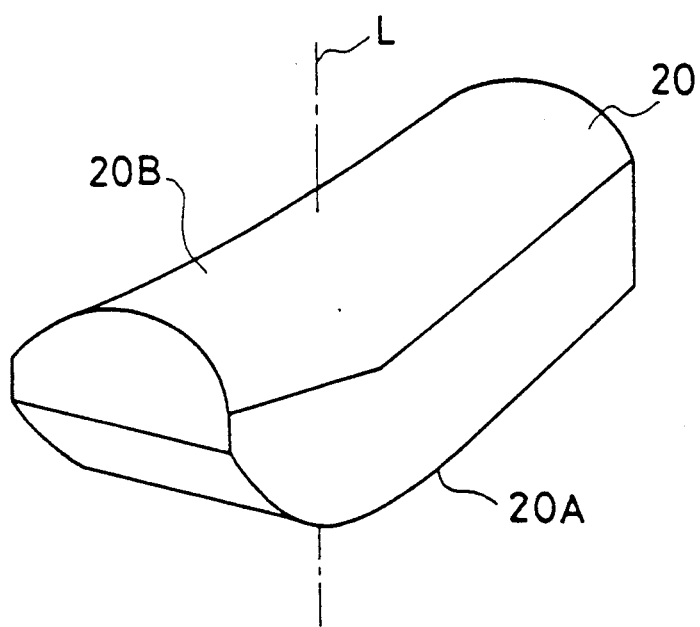
FIG. 8 is a perspective view of an embodiment of the lens in the optical system.

FIG. 8 is a perspective view of a lens 20 in an embodiment of the lens in the optical system of the optical reader. In this embodiment, the first lens 7 or 8 is combined integral with the second lens 9 or 10 to form the lens 20. Referring to FIG. 8, a lower part 20A of the lens 20 functions as the first lens 7 or 8, and an upper part 20B functions as the second lens 9 or 10.

Figure 9:
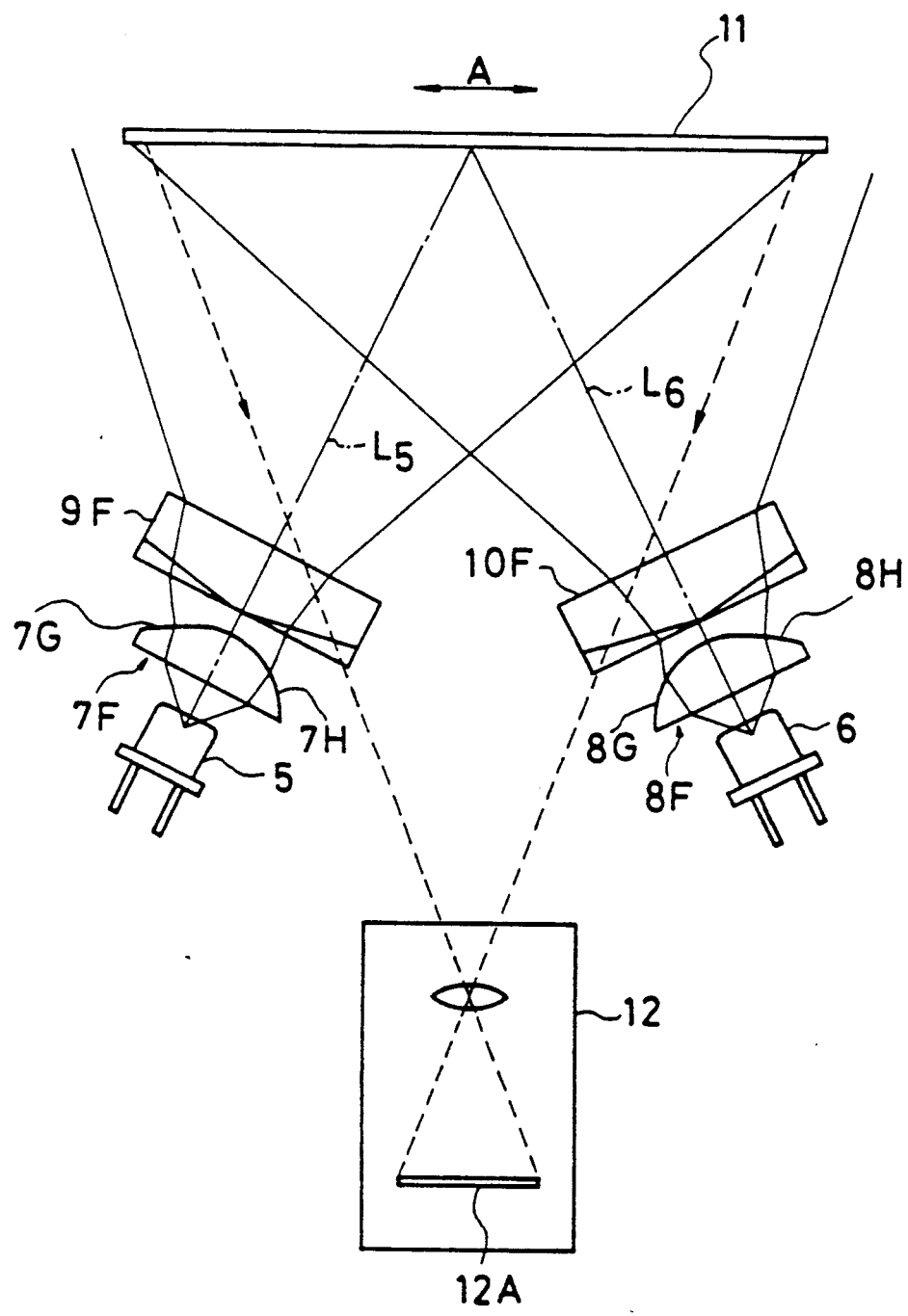
FIG. 9 is a plan view of a second embodiment of an optical system in the optical code reader in accordance with the present invention.

FIG. 9 is a plan view of another embodiment of an optical system in the optical code reader in accordance with the present invention. In this embodiment, the left optical system composed of the LED 5, a first lens 7F and a second lens 9F is inclined in a manner that the optical axis L5 passes through the center of the object 11; and the right optical system composed of the LED 6, a first lens 8F and a second lens 10F is also inclined in the same manner as the left optical system. The first lens 7F has a small difference between the curvature radii of parts 7G and 7H. The first lens 8F is symmetrical to the first lens 7F.

Figure 10A:
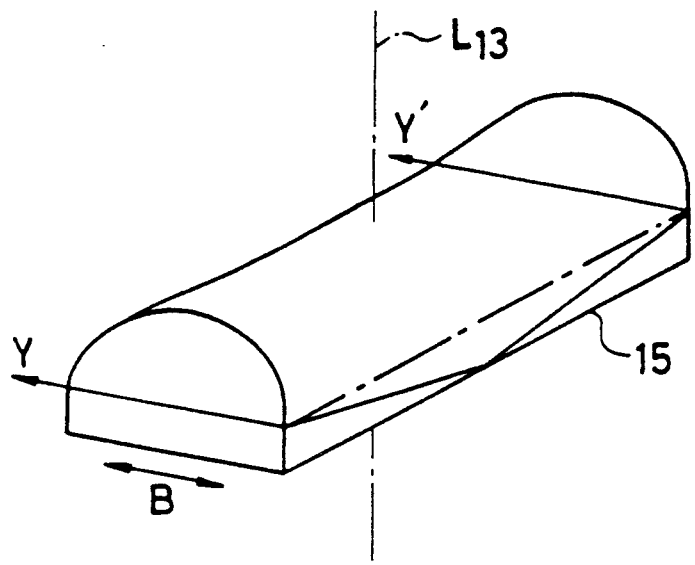
FIG. 10(a) is a perspective view of a second lens in the second and third embodiments.

The curvature radius of the semicylindrical upper part of the second lens 9F or 10F is smallest at the center, and gradually increases toward both ends as shown in FIG. 10(a).

According to the second embodiment, since the object 11 is illuminated by both lights of the LED 5 and 6, if either one of the LEDs 5 and 6 is malfunctioning, or if the light path of either one optical systems is intercepted by something for some reason, the whole bar-code area of the object 11 is illuminated by the remaining LED.

Figure 10B:
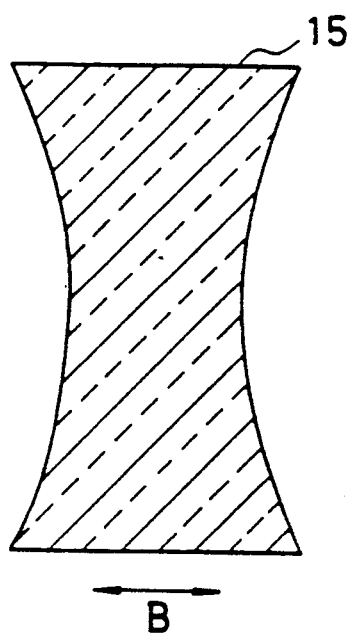
FIGS. 10(b) and 10(c) are cross sectioned views of the second lens.
Figure 10C:
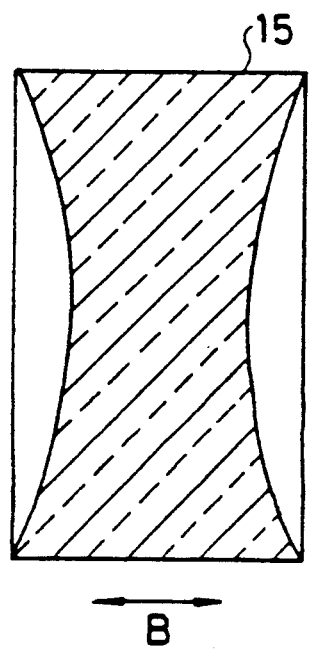
Figure 11A:
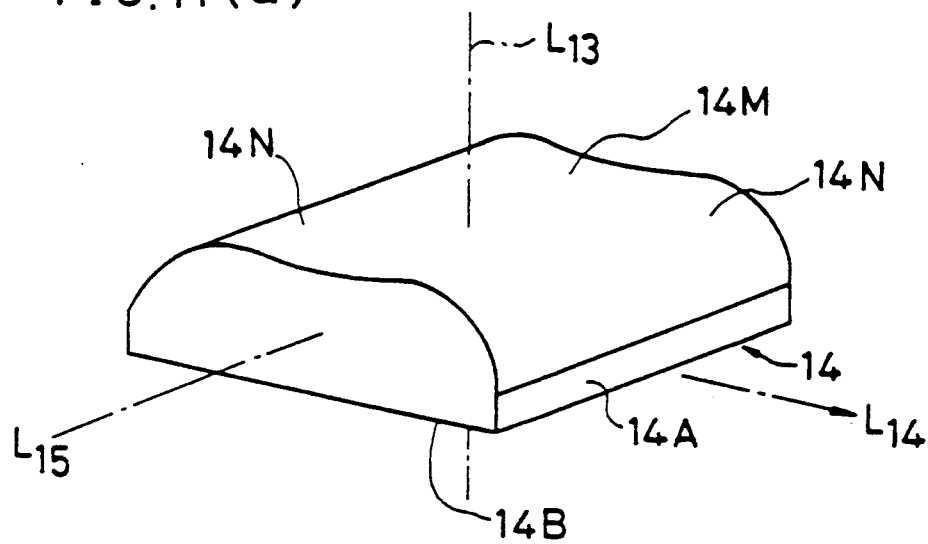
FIG. 11(a) is a perspective view of a first lens in the second embodiment.
Figure 12:
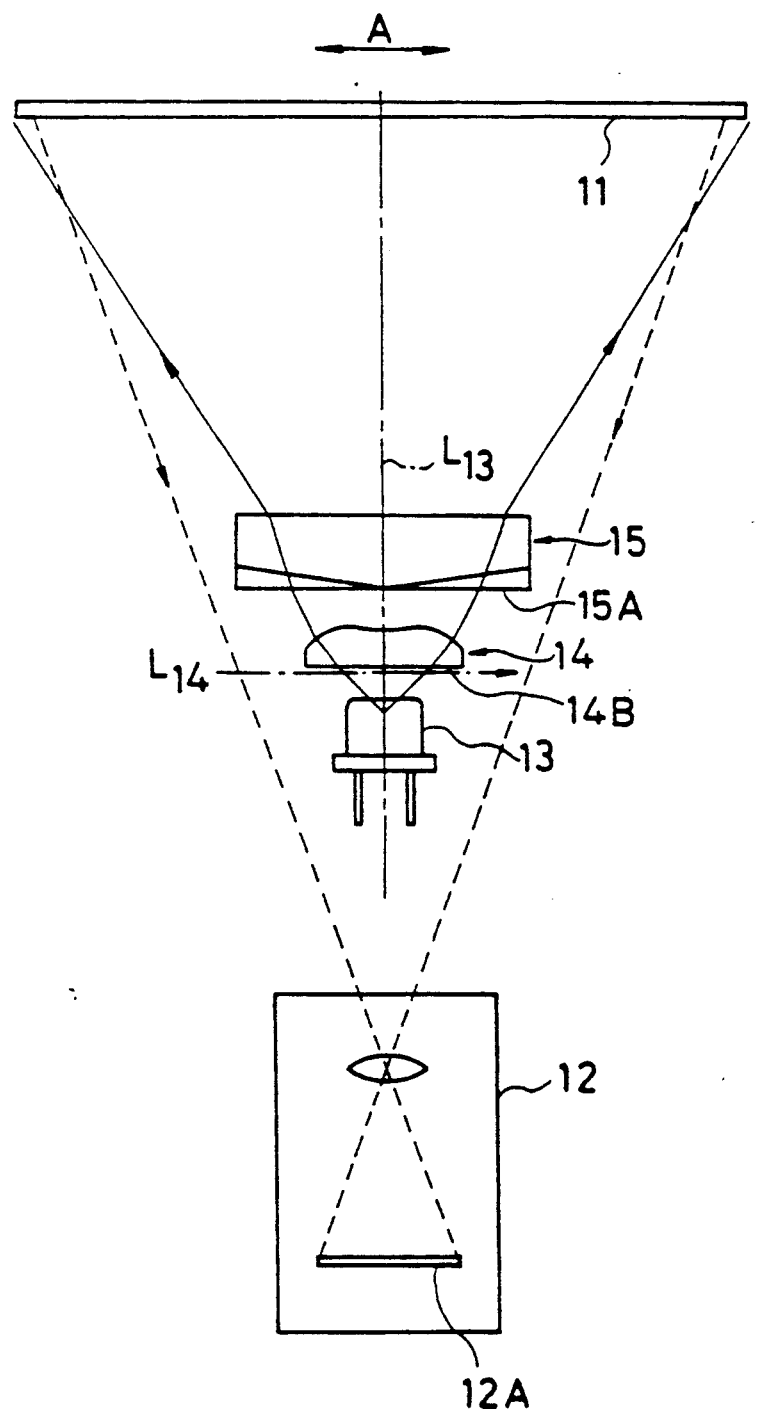
FIG. 12 is a plan view of a third embodiment of an optical system in the optical code reader in accordance with the present invention.
Figure 13A:
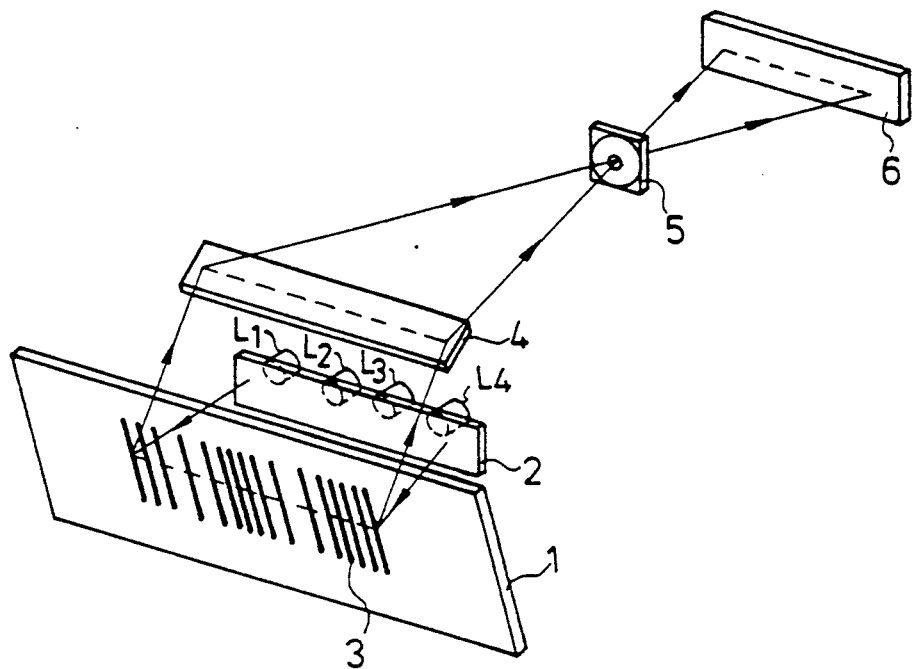
FIG. 13(a) is the perspective view of the optical system in the prior art.
Figure 13B:
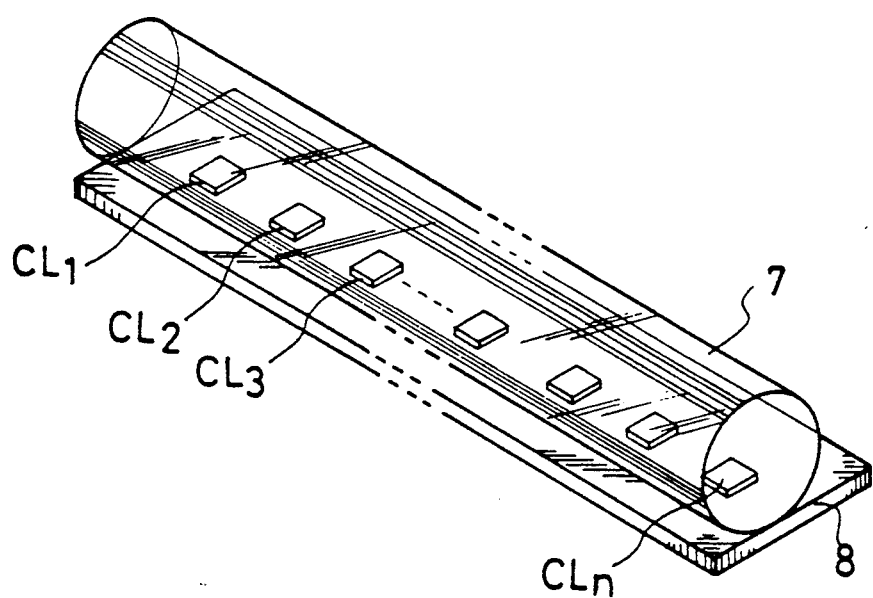
FIG. 13(b) is the perspective view of another optical system in the prior art.

FIG. 12 is a plan view of a third embodiment of the optical system in the optical code reader in accordance with the present invention. In this embodiment, a light beam emitted from a LED 13 is converged on the object 11 by a first lens 14 and a second lens 15 positioned in front of the LED 13 in the named order. The first lens 14 is an irregular semicylindrical member which is concave on a central part 14M along the length thereof as shown in FIG. 11(a). The curvature radius of convex parts 14N gradually decreases toward both side walls 14A which are vertical plane surfaces. The first lens 14 is arranged in a manner that an axis L14 (FIG. 10)

which is substantially perpendicular to the side walls 14A is in parallel to the length of the object 11 and the line sensor 12A of the optical read means 12. The second lens 15 is similar to the second lens 9F or 10F in the second embodiment.

Figure 11B:
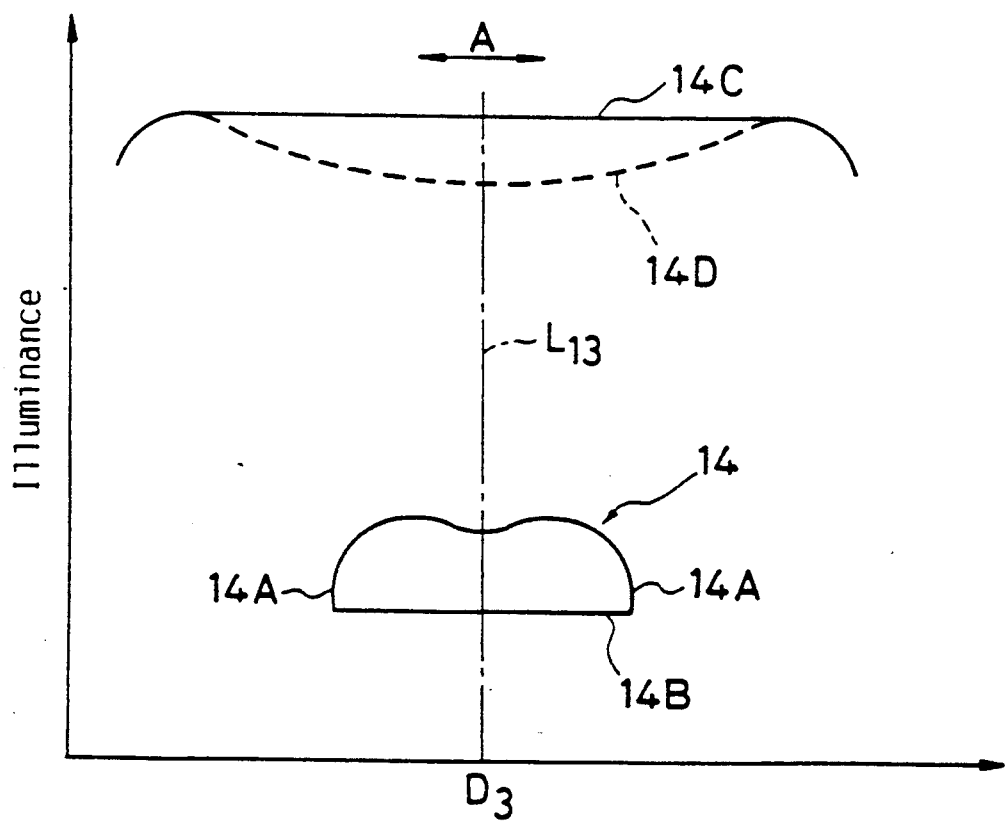
FIG. 11(b) is a graph of illuminance distribution in the third embodiment.

FIG. 11(b) is a graph of illuminance distribution along the length of the object 11 in the third embodiment. Referring to the graph, a solid line 14C designates illuminance distribution in this embodiment. If desired, illuminance at the end parts of the object 11 may be relatively enhanced as designated by a dashed line 14D by changing the curvature radius of the concave part 14M. In this embodiment, the light beam emitted from the LED 13 is also converged into a strip-shaped area having a predetermined width on the object 11.

Furthermore, the first lens 14 can be combined with the second lens 15 in a manner that the surface 14B of the first lens 14 is joined to the surface 15A of the second lens 15 in one body.

In the optical code reader in accordance with the present invention, the light beam emitted from the LED is converged with regard to two directions, one is parallel to the length of the object 11, and the other is perpendicular to both the length of the object 11 and the optical axis L of the optical system. Thus, the light emitted from the LED is effectively available for illuminating the object. Hence, a sufficient illuminance on the object is obtained by using one or two LEDs. Furthermore, assembly work of the LED is simplified because of small number of the LED, and thus the assembly cost of the optical code reader can be eliminated.

Although the invention has been described in its preferred form with a certain degree of particularity, it is understood that the present disclosure of the preferred form may be changed in the details of construction and the combination and arrangement of parts may be altered to without departing from the spirit and the scope of the invention as hereinafter claimed.

What is claimed is:

1. An apparatus for optically reading a bar code from an object, said apparatus comprising:
   no more than two light emitting diodes for producing light that is converged on said bar code;
   optical lens means for focusing and converging said light on a strip-shaped zone in a first direction parallel to a longitudinal axis of said bar code and in a second direction perpendicular to said first direction, said second direction being in a plane containing said first direction, said focused and converged light entirely illuminating said bar code; and
   means for receiving and reading said light reflected by said bar code, said reading means including a line-sensor for receiving the reflected light;
   wherein the optical lens means includes first and second lenses positioned proximate an output face of each light emitting diode;
   wherein each of said first lenses focuses and converges said light from the light emitting diode proximate thereto in said first direction;
   wherein each of said first lenses includes a first curvature on a part of an exit surface of the first lens positioned farthest from a center line of said bar code reader and a second curvature on a part of the exit surface positioned closest the center line of the bar code reader, said first curvature having a larger radius of curvature than said second curvature; and
   wherein each of said second lenses includes a substantially semi-cylindrical body having a varying radius of curvature along the length thereof, the radius of curvature decreasing from an end of the second lens toward an optical axis of the light emitting diode, said optical axis being dislocated from the center of the second lens so as to divide said second lens into a short and long segment with the long segment being positioned towards an interior of said apparatus and the short side being positioned towards the exterior of said apparatus.

2. An apparatus for optically reading a bar code from an object, said apparatus comprising:
   no more than two light emitting diodes for producing light that is converged on said bar code;
   optical lens means comprising first lenses and second lenses for focusing and converging said light on a strip-shaped zone without any loss in the light emitted from the light emitting diodes in a first direction parallel to a longitudinal axis of said bar code and in a second direction perpendicular to said first direction, said second direction being in a plane containing said first direction, said focused and converged light entirely illuminating said bar code, and each of said first lenses includes a first curvature on a part of an exit surface of the first lens positioned farthest from a center line of said apparatus and a second curvature on a part of the exit surface positioned nearest the center line of said apparatus, said first curvature having a larger radius of curvature than said second curvature, and each of said second lenses focuses and converges said light from the light emitting diodes proximate thereto in said second direction, and
   means for receiving and reading light reflected by said bar code, said reading means including a line-sensor for receiving the reflected light.

3. An apparatus as claimed in claim 2, wherein said optical lens means includes a single, multi-functional lens disposed between each light emitting diode and said bar code.

4. An apparatus as claimed in claim 2, wherein said first and second lenses are integral with one another.

5. An apparatus for optically reading a bar code from an object, said apparatus comprising:
   no more than two light emitting diodes for producing light that is converged on said bar code, disposed in a manner that each of said light emitting diodes is inclined at an angle so that each light emitting diode entirely illuminates said bar code,
   optical lens means comprising first lenses and second lenses for focusing and converging said light on a strip-shaped zone without any loss in the light emitted from the light emitting diodes in a first direction parallel to a longitudinal axis of said bar code and in a second direction perpendicular to said first direction, said second direction being in a plane containing said first direction, said focused and converged light entirely illuminating said bar code, and each of said first lenses includes a first curvature on a part of an exit surface of the first lens positioned farthest from a center line of said apparatus and a second curvature on a part of the exit surface positioned nearest the center line of said apparatus, said first curvature having a larger radius of curvature than said second curvature, and each of said second lenses focuses and converges said light from the light emitting diodes proximate thereto in said second direction, and means for receiving and reading light reflected by said bar code, said reading means including a line-sensor for receiving the reflected light.

6. An apparatus as claimed in claim 5, wherein said first and second lenses are integral with one another.

7. An apparatus as claimed in claim 5, wherein said optical lens means includes a single, multi-functional lens disposed between each light emitting diode and said bar code.

8. An apparatus for optically reading a bar code from an object, said apparatus comprising:

a single light emitting diode for producing light that is converged on said bar code, positioned opposite a center of said bar code, optical lens means comprising a first lens including a concavity in a center of an exit surface thereof and a second lens for focusing and converging said light on a strip-shaped zone without any loss in the light emitted from the light emitting diodes in a first direction parallel to a longitudinal axis of said bar code and in a second direction perpendicular to said first direction, respectively, said second direction being in a plane containing said first direction, said focused and converged light entirely illuminating said bar code; and means for receiving and reading light reflected by said bar code, said reading means including a line-sensor for receiving the reflected light.

9. An apparatus as claimed in claim 8, wherein said second lens is a semicylindrical lens having a varying radius of curvature along the length thereof and focuses and converges said light from the light emitting diode in said second direction.

* * * * *